(12) United States Patent
Mitsunobu et al.

(10) Patent No.: US 11,692,249 B2
(45) Date of Patent: Jul. 4, 2023

(54) HOT STAMPED BODY

(71) Applicant: NIPPON STEEL CORPORATION, Tokyo (JP)

(72) Inventors: Takuya Mitsunobu, Tokyo (JP); Takehiro Takahashi, Tokyo (JP); Jun Maki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/802,583

(22) PCT Filed: Feb. 27, 2020

(86) PCT No.: PCT/JP2020/008164
§ 371 (c)(1),
(2) Date: Aug. 26, 2022

(87) PCT Pub. No.: WO2021/171519
PCT Pub. Date: Sep. 2, 2021

(65) Prior Publication Data
US 2023/0147056 A1 May 11, 2023

(51) Int. Cl.
*C22C 30/06* (2006.01)
*B32B 15/01* (2006.01)
*C23C 2/06* (2006.01)

(52) U.S. Cl.
CPC ............ *C22C 30/06* (2013.01); *B32B 15/013* (2013.01); *C23C 2/06* (2013.01)

(58) Field of Classification Search
CPC ................................ C22C 18/04; C22C 38/06
See application file for complete search history.

(56) References Cited

U.S. PATENT DOCUMENTS

2019/0390303 A1 12/2019 Tokuda et al.
2020/0002798 A1 1/2020 Tokuda et al.
2021/0039354 A1* 2/2021 Tokuda ................. C22C 38/001

FOREIGN PATENT DOCUMENTS

| JP | 2009-120948 A | 6/2009 |
| JP | 2012-112010 A | 6/2012 |
| WO | WO 2005/113233 A2 | 12/2005 |
| WO | WO 2018/139619 A1 | 8/2018 |
| WO | WO 2018/139620 A1 | 8/2018 |
| WO | WO 2019/180852 A1 | 9/2019 |

* cited by examiner

*Primary Examiner* — Adam Krupicka
(74) *Attorney, Agent, or Firm* — Birch, Slewart, Kolasch & Birch, LLP

(57) ABSTRACT

A hot stamped body comprising a steel base material and an Al—Zn—Mg-based plating layer formed on a surface of the steel base material, wherein the plating layer has a predetermined chemical composition, the plating layer comprises an interfacial layer positioned at an interface with the steel base material and containing Fe and Al and a main layer positioned on the interfacial layer, the main layer comprises, by area ratio, 10.0 to 85.0% of an Mg—Zn containing phase and 15.0 to 90.0% of an Fe—Al containing phase, the Mg—Zn containing phase comprises at least one selected from the group consisting of an MgZn phase, $Mg_2 Zn_3$ phase, and $MgZn_2$ phase, and the Fe—Al containing phase comprises at least one of an FeAl phase and Fe—Al—Zn phase and an area ratio of the Fe—Al—Zn phase in the main layer is 10.0% or less.

11 Claims, 2 Drawing Sheets

HOT STAMPED BODY

FIELD

The present invention relates to a hot stamped body.

BACKGROUND

As a technique for press-forming a material which is difficult to shape, such as high strength steel sheet, hot stamping (hot pressing) is known. Hot stamping is a hot shaping technique which shapes a material supplied for shaping after heating it. In this technique, the material is shaped after heating, therefore at the time of shaping, the steel material is soft and has good shapeability. Therefore, even a high strength steel material can be precisely formed into a complicated shape. Further, the press die simultaneously performs the shaping and hardening, therefore it is known that after shaping, the steel material has sufficient strength.

PTL 1 describes a plated steel sheet for hot pressing characterized by having an Al—Zn-based alloy plating layer containing Al: 20 to 95 mass %, Ca+Mg: 0.01 to 10 mass %, and Si on the steel sheet surface. Further, PTL 1 describes that such a plated steel sheet can prevent the plating from adhering to the die at the time of hot pressing, since oxides of Ca or Mg are formed on the surface of the Al—Zn-based alloy plating layer.

In relation to an Al—Zn-based alloy plating, PTL 2 describes an alloy plated steel material characterized by containing, by mass %, Al: 2 to 75%, Fe: 2 to 75%, and a balance of 2% or more of Zn and unavoidable impurities in the plating layer. Further, PTL 2 teaches that, from the viewpoint of improvement of the corrosion resistance, it is effective to further include Mg: 0.02 to 10%, Ca: 0.01 to 2%, Si: 0.02 to 3%, etc., in the plating layer.

Further, in relation to an Al—Zn-based alloy plating, PTL 3 describes a Zn-based plated steel material for hot pressing having at a surface-most layer an oxide layer mainly comprising Zn and containing Mn in 1% or more in mass %, having underneath that a plating layer comprising a Zn-based alloy, and containing in the Zn-based plated layer one or more of Ni: 0.01 to 20%, Cr: 0.01 to 10%, Mn: 0.01 to 10%, Mo: 0.01 to 5%, Co: 0.01 to 5%, Al: 0.01 to 60%, Si: 0.01 to 5%, Mg: 0.01 to 10%, Ca: 0.01 to 5%, and Sn: 0.01 to 10%.

Further, PTL 4 describes a plated steel material comprising a steel material and a plating layer arranged on the surface of the steel material and containing a Zn—Al—Mg alloy layer, wherein the Zn—Al—Mg alloy layer has a Zn phase, the Zn phase contains an Mg—Sn intermetallic compound phase, and the plating layer contains, by mass %, Zn: more than 65.0%, Al: more than 5.0% to less than 25%, Mg: more than 3.0% to less than 12.5%, Ca: 0% to 3.00%, Si: 0% to less than 2.5%, etc.

Similarly, PTL 5 describes a plated steel material comprising a steel material and a plating layer arranged on a surface of the steel material and containing a Zn—Al—Mg alloy layer, wherein, in a cross-section of the Zn—Al—Mg alloy layer, an area ratio of an $MgZn_2$ phase is 45 to 75%, an area ratio of a total of the $MgZn_2$ phase and Al phase is 70% or more, an area ratio of a Zn—Al—$MgZn_2$ ternary eutectic structure is 0 to 5%, and the plating layer contains, by mass %, Zn: more than 44.90% to less than 79.90%, Al: more than 15% to less than 35%, Mg: more than 5% to less than 20%, Ca: 0.1% to less than 3.0%, Si: 0% to 1.0%, etc.

CITATIONS LIST

Patent Literature

[PTL 1] Japanese Unexamined Patent Publication No. 2012-112010
[PTL 2] Japanese Unexamined Patent Publication No. 2009-120948
[PTL 3] Japanese Unexamined Patent Publication No. 2005-113233
[PTL 4] WO 2018/139619
[PTL 5] WO 2018/139620

SUMMARY

Technical Problem

If, for example, using a Zn-based plated steel material in hot stamping, the material is worked in a state where the Zn is molten, therefore the molten Zn will sometimes penetrate into the steel and cause cracking inside the steel material. Such a phenomenon is called "liquid metal embrittlement (LME)". It is known that the fatigue characteristics of a steel material fall due to the LME.

On the other hand, if using a plated steel material containing Al as a constituent of the plating layer in hot stamping, it is known that, for example, the hydrogen generated at the time of heating in the hot stamping will sometimes penetrate the steel material and cause hydrogen embrittlement cracking.

However, in conventional Al—Zn-based plated steel materials used in hot stamping, there has not necessarily been sufficient study from the viewpoint of suppressing LME and hydrogen embrittlement cracking. As a result, in a hot stamped body obtained from such a plated steel material, there was still room for improvement relating to the LME resistance and hydrogen penetration resistance.

Therefore, an object of the present invention is to provide a hot stamped body improved in the LME resistance and hydrogen penetration resistance and, further, excellent in the corrosion resistance.

Solution to Problem

The present invention to achieve the above object is as follows:

(1) A hot stamped body comprising a steel base material and a plating layer formed on a surface of the steel base material, wherein the plating layer has a chemical composition comprising, by mass %,
Al: 15.00 to 45.00%,
Mg: 4.50 to 12.00%,
Si: 0.05 to 3.00%,
Ca: 0.05 to 3.00%,
Fe: 20.00 to 50.00%,
Sb: 0 to 0.50%,
Pb: 0 to 0.50%,
Cu: 0 to 1.00%,
Sn: 0 to 1.00%, Ti: 0 to 1.00%,
Sr: 0 to 0.50%,
Cr: 0 to 1.00%,
Ni: 0 to 1.00%,
Mn: 0 to 1.00%, and
balance: Zn and impurities,
the plating layer comprises an interfacial layer positioned at an interface with the steel base material and containing Fe and Al and a main layer positioned on the interfacial layer,
the main layer comprises, by area ratio, 10.0 to 85.0% of an Mg—Zn containing phase and 15.0 to 90.0% of an Fe—Al containing phase,
the Mg—Zn containing phase comprises at least one selected from the group consisting of an MgZn phase, $Mg_2Zn_3$ phase, and $MgZn_2$ phase, and
the Fe—Al containing phase comprises at least one of an FeAl phase and Fe—Al—Zn phase and an area ratio of the Fe—Al—Zn phase in the main layer is 10.0% or less.

(2) The hot stamped body according to the above (1), wherein the chemical composition of the plating layer comprises, by mass %,
Al: 20.00 to 30.00% and
Mg: 5.50 to 10.00%.

(3) The hot stamped body according to the above (1) or (2), wherein the Mg—Zn containing phase comprises an MgZn phase, and an area ratio of the MgZn phase in the main layer is 30.0% or more.

(4) The hot stamped body according to any one of the above (1) to (3), wherein the Mg—Zn containing phase comprises an MgZn phase and $Mg_2 Zn_3$ phase, and an area ratio of a total of the MgZn phase and $Mg_2 Zn_3$ phase in the main layer is 25.0 to 85.0%.

(5) The hot stamped body according to any one of the above (1) to (4), wherein the Fe—Al containing phase comprises an FeAl phase and an area ratio of the FeAl phase in the main layer is 5.0 to 55.0%.

Advantageous Effects of Invention

According to the present invention, it is possible to provide a hot stamped body improved in the LME resistance and hydrogen penetration resistance and, further, excellent in the corrosion resistance.

DESCRIPTION OF EMBODIMENTS

<Hot Stamped Body>

Figure 1:
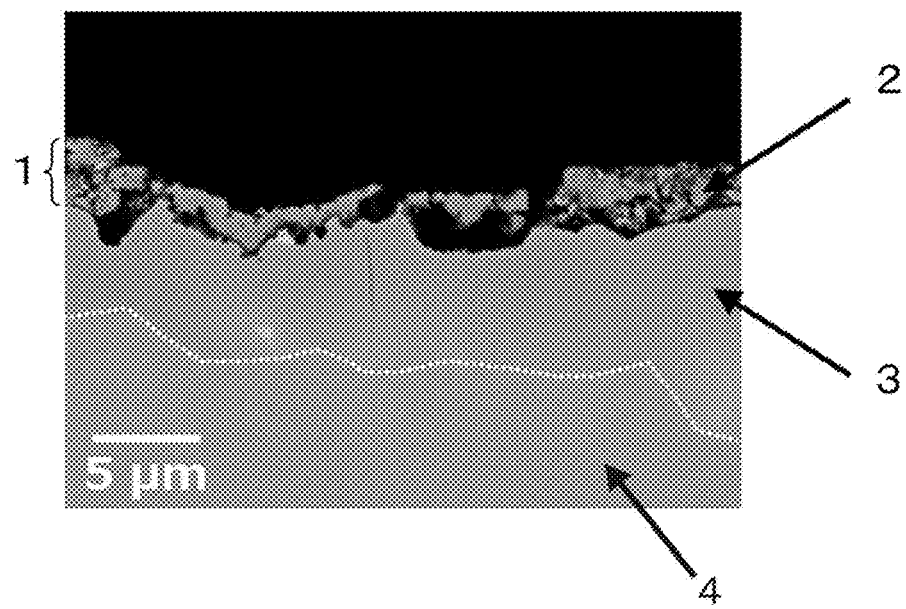
FIG. 1 shows a backscattered electron image (BSE image) of a scanning electron microscope (SEM) of a plating layer cross-section in a conventional hot stamped body including an Al—Zn—Mg-based plating layer.

The hot stamped body according to an embodiment of the present invention comprises a steel base material and a plating layer formed on a surface of the steel base material, wherein the plating layer has a chemical composition comprising, by mass %,
Al: 15.00 to 45.00%,
Mg: 4.50 to 12.00%,
Si: 0.05 to 3.00%,
Ca: 0.05 to 3.00%,
Fe: 20.00 to 50.00%,
Sb: 0 to 0.50%,
Pb: 0 to 0.50%,
Cu: 0 to 1.00%,
Sn: 0 to 1.00%,
Ti: 0 to 1.00%,
Sr: 0 to 0.50%,
Cr: 0 to 1.00%,
Ni: 0 to 1.00%,
Mn: 0 to 1.00%, and
balance: Zn and impurities,
the plating layer comprises an interfacial layer positioned at an interface with the steel base material and containing Fe and Al and a main layer positioned on the interfacial layer,
the main layer comprises, by area ratio, 10.0 to 85.0% of an Mg—Zn containing phase and 15.0 to 90.0% of an Fe—Al containing phase,
the Mg—Zn containing phase comprises at least one selected from the group consisting of an MgZn phase, $Mg_2Zn_3$ phase, and $MgZn_2$ phase, and
the Fe—Al containing phase comprises at least one of an FeAl phase and Fe—Al—Zn phase and an area ratio of the Fe—Al—Zn phase in the main layer is 10.0% or less.

For example, if using a conventional Zn-based plated steel material or an Al—Zn-based plated steel material for hot stamping, in general the plated steel material will be heated in the hot stamping to about 900° C. or a higher temperature than that. Zn has a boiling point of about 907° C., which is relatively low, therefore at such a high temperature, the Zn in the plating layer will evaporate or melt, resulting in the partial formation of a high concentration Zn liquid phase in the plating layer and the penetration of the liquid Zn into the crystal grain boundaries in the steel in some cases causing liquid metal embrittlement (LME) cracking.

On the other hand, in a conventional Al plated steel material not containing Zn, LME cracking due to Zn will not occur, but at the time of heating in the hot stamping, the water vapor in the atmosphere will sometimes be reduced by the Al in the plating layer, resulting in the generation of hydrogen. As a result, the generated hydrogen will sometimes penetrate the steel material and cause hydrogen embrittlement cracking. Further, in an Al—Zn-based plated steel material as well, since Zn has a relatively low boiling point as explained above, at the time of hot stamping at a 900° C. or higher temperature, a part of the Zn will evaporate and sometimes will react with the water vapor in the atmosphere and cause the generation of hydrogen. In such a case, hydrogen embrittlement cracking is liable to occur due to hydrogen penetrating the steel material due to not only the Al, but also the Zn. In addition, from the viewpoint of improvement of the corrosion resistance, regarding the Mg and other elements which are added to the Zn-based plated steel material or Al—Zn-based plated steel material, sometime parts thereof will evaporate at the time of heating in hot stamping at a high temperature and, in the same way as the case of Zn, cause production of hydrogen triggering hydrogen embrittlement cracking.

Further, if the elements Zn and/or Mg having the effect of improving the corrosion resistance at the time of hot stamping at a high temperature evaporate and parts of those elements are lost, naturally a problem will arise in that it is not possible to maintain sufficient corrosion resistance in the body after hot stamping. Furthermore, if the Zn and/or Mg in the plating layer evaporate and are lost, in the plating layer after the hot stamping, relatively large amounts of Al—Fe-based intermetallic compounds and/or Zn—Fe-based intermetallic compounds will be formed between the Fe which had been diffused from the base iron and the Al and/or Zn in the plating layer. These intermetallic compounds become causes of red rust in corrosive environments.

Therefore, the inventors studied the corrosion resistance, LME resistance, and hydrogen penetration resistance in hot stamped bodies which include Al—Zn—Mg-based plating layers. As a result, the inventors discovered that in a hot stamped body comprising an Al—Zn—Mg-based plating layer having a predetermined chemical composition and containing a predetermined amount of an Mg—Zn containing phase in the plating layer after hot stamping, it is possible to remarkably reduce or suppress LME and penetration of hydrogen into the steel material due to the heating in the hot stamping and to achieve sufficient corrosion resistance. In addition, the inventors discovered that by limiting the amount of the Fe—Al—Zn phase contained in the plating layer to within a predetermined range, the hydrogen penetration resistance of the hot stamped body is further improved. Below, this will be explained more specifically while referring to the drawings.

FIG. 1 shows a backscattered electron image (BSE image) of a scanning electron microscope (SEM) of a plating layer cross-section in a conventional hot stamped body containing an Al—Zn—Mg-based plating layer. Referring to FIG. 1, it will be understood that the plating layer 1 contains a thick oxide layer 2 containing Zn and Mg. The oxide layer 2 is believed to be the result of at least part of the Zn and Mg evaporating due to heating at about 900° C. in the hot stamping or a higher temperature than that depositing on the surface of the plating layer as oxides. On the other hand, a diffusion layer 3 is positioned below the plating layer 1. The diffusion layer 3 forms part of the steel base material 4. The diffusion layer 3 results from the Al constituent in the plating layer diffusing into the steel base material 4 and forming a solid solution due to the heating in the hot stamping.

In a conventional hot stamped body containing an Al—Zn—Mg-based plating layer such as shown in FIG. 1, the Zn and Mg evaporate during the heating in the hot stamping, therefore LME and hydrogen penetration into the steel material occur. Furthermore, the corrosion resistance of the hot stamped body greatly falls due to the loss of at least part of the Zn and Mg due to evaporation of these elements and the decrease in the Zn and Mg in the metal phase accompanying formation of the oxides. In addition, for example, LME cracking is liable to be caused even when the concentration of Zn in the plating layer 1 relatively rises due to evaporation of Mg.

Figure 2:
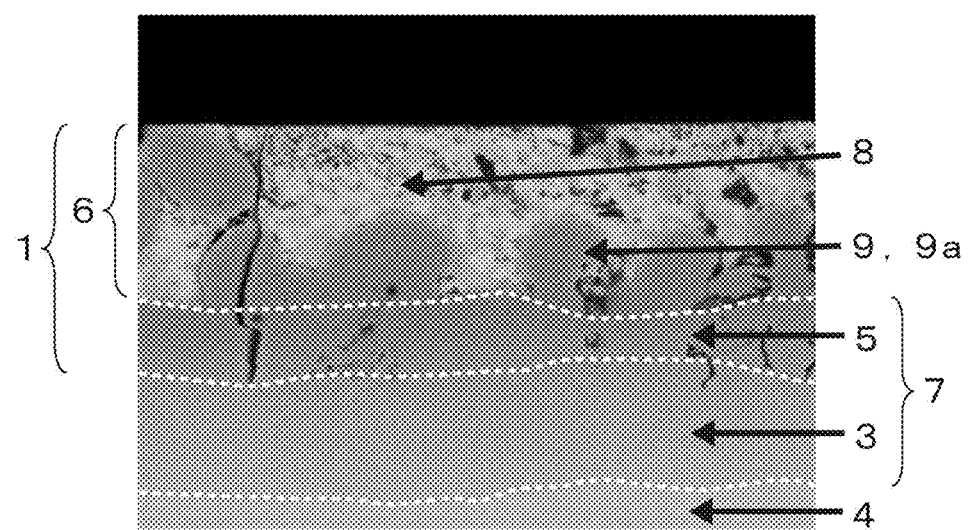
FIG. 2 shows a backscattered electron image (BSE image) of a scanning electron microscope (SEM) of a plating layer cross-section in a hot stamped body according to the present invention.

FIG. 2 shows a backscattered electron image (BSE image) of a scanning electron microscope (SEM) of a plating layer cross-section in a hot stamped body according to the present invention. Referring to FIG. 2, the plating layer 1 comprises an interfacial layer 5 positioned at the interface with the steel base material 4, more specifically at the interface with the diffusion layer 3 forming part of the steel base material 4, and containing Fe and Al and a main layer 6 positioned on the interfacial layer 5. The interfacial layer 5, in normal hot stamping, is formed at the interface with the steel base material and is mainly comprised of intermetallic compounds containing Fe and Al. The interfacial layer 5 and the diffusion layer 3 positioned beneath it are almost no different in chemical composition since the metal elements of the layers diffuse into each other due to the relatively long heat treatment in the hot stamping for example. Therefore, in the present invention, the interfacial layer 5 and the diffusion layer 3 will sometimes not particularly be differentiated and the two together will sometimes be expressed as the "Fe—Al layer 7".

Further, it will be understood that the main layer 6, in contrast to the case of FIG. 1, contains an Mg—Zn containing phase 8 containing at least one selected from the group consisting of an MgZn phase, $Mg_2 Zn_3$ phase, and $MgZn_2$ phase, and an Fe—Al containing phase 9 comprising an FeAl phase 9a. While not shown in FIG. 2, the Fe—Al containing phase 9 sometimes includes, in addition to the FeAl phase 9a, a relatively small amount of an Fe—Al—Zn phase. In particular, it will be understood that the main layer 6 shown in FIG. 2 has a structure (island-in-sea structure) of a matrix phase of an Mg—Zn containing phase 8 in which islands of the Fe—Al containing phase 9 (islands of FeAl phase 9a and islands of Fe—Al—Zn phase) are present, in particular are present dispersed. In the hot stamped body according to the present invention, by including an Mg—Zn containing phase 8 such as shown in FIG. 2 in the main layer 6 of the plating layer 1 in a relatively large amount, it is possible to remarkably reduce or suppress occurrence of LME and penetration of hydrogen into the steel material and to achieve sufficient corrosion resistance. In addition, by controlling the amount of the Fe—Al—Zn phase contained in the main layer 6 to within a predetermined range or by not including an Fe—Al—Zn phase in the main layer 6, it is possible to further improve the hydrogen penetration resistance of the hot stamped body.

While not intending to be bound by any specific theory, in the hot stamped body according to the present invention, as explained in detail later in relation to the method of production, at the start of heating in the hot stamping, it is believed that the Ca leached out from the acicular Al—Zn—Si—Ca phase present in the surface structure of the plating layer is preferentially oxidized by the oxygen in the atmosphere and forms a dense Ca-based oxide film at the surface-most part of the plating layer. In other words, it is believed that the acicular Al—Zn—Si—Ca phase present in the surface structure of the plating layer before hot stamping functions as a supply source of Ca for forming a Ca-based oxide film at the start of heating in hot stamping, then the Ca-based oxide film obtained by the oxidation of Ca supplied, more specifically a Ca- and Mg-containing oxide film, functions as a barrier layer.

Due to the function of such a barrier layer, it is believed that evaporation of Zn and Mg in the plating layer to the outside and the related occurrence of LME and the penetration of hydrogen from the outside can be decreased or suppressed. As a result, it is believed that in the body finally obtained after hot stamping, unlike the case of FIG. 1, Zn and Mg can be kept from forming a thick oxide layer 2 in the plating layer 1, can be made present as an Mg—Zn containing phase 8 in a relatively large amount, i.e., in an amount of 10.0 to 85.0% by area ratio in the main layer 6, and therefore the drop in corrosion resistance due to the evaporation of Zn and Mg to the outside can be remarkably suppressed.

Further, the FeAl phase 9a contained in the Fe—Al containing phase 9, as shown in FIG. 2, is present in a relatively large amount near the interface of the main layer 6 and the interfacial layer 5, while the Fe—Al—Zn phase (not shown) is present in a relatively large amount near the surface of the main layer 6. Therefore, if the content of the Fe—Al—Zn phase in the main layer 6 becomes greater, only naturally, the amount of the Fe—Al—Zn phase present near the surface of the main layer 6 will also become greater. In such a case, at the time of the heating in the hot stamping, the water vapor in the atmosphere will be reduced by the Al in the Fe—Al—Zn phase and hydrogen will be generated. As a result, sometimes the generated hydrogen will penetrate the steel material and cause hydrogen embrittlement cracking. In the hot stamped body according to the present invention, it is believed that by limiting the Fe—Al—Zn phase in the main layer 6 to within a predetermined range, i.e, to within an area ratio of 10.0% or less, the amount of hydrogen generated due to the Fe—Al—Zn phase can be reduced. As a result, it is believed that, compared with simply controlling the amount of the Mg—Zn containing phase in the plating layer, it becomes possible to further improve the hydrogen penetration resistance of the hot stamped body.

Below, the hot stamped body according to an embodiment of the present invention will be explained in detail. In the following explanation, the "%" relating to the contents of the constituents means "mass %" unless otherwise indicated.

[Steel Base Material]

The steel base material according to the embodiment of the present invention may be a material having any thickness and composition. It is not particularly limited, but, for example, is preferably a material having a thickness and composition suitable for application to hot stamping. Such a steel base material is known, and may include, for example, a steel sheet having a 0.3 to 2.3 mm thickness and comprising, by mass %, C: 0.05 to 0.40%, Si: 0.50% or less, Mn: 0.50 to 2.50%, P: 0.03% or less, S: 0.010% or less, sol. Al: 0.10% or less, N: 0.010% or less, and a balance: Fe and impurities (for example, a cold rolled steel sheet), etc. Below, the constituents contained in the steel base material preferably applied in the present invention will be explained in detail.

[C: 0.05 to 0.40%]

Carbon (C) is an element effective for raising the strength of a hot stamped body. However, if the C content is too great, the hot stamped body will sometimes fall in toughness. Therefore, the C content is 0.05 to 0.40%. The C content is preferably 0.10% or more, more preferably 0.13% or more. The C content is preferably 0.35% or less.

[Si: 0 to 0.50%]

Silicon (Si) is an element effective for deoxidizing steel. However, if the Si content is too great, the Si in the steel diffuses at the time of heating in the hot stamping and forms oxides at the steel material surface. As a result, the efficiency of phosphate treatment sometimes falls. Further, Si is an element making the $Ac_3$ point of the steel rise. For this reason, since the heating temperature of the hot stamping has to be the $Ac_3$ point or more, if the amount of Si becomes excessive, the heating temperature of the hot stamping of the steel will inevitably become higher. In other words, steel with a large amount of Si is heated to a higher temperature at the time of hot stamping and, as a result, Zn, etc., in the plating layer will unavoidably evaporate. To avoid such a situation, the Si content is 0.50% or less. The Si content is preferably 0.30% or less, more preferably 0.20% or less. The Si content may also be 0%, but to obtain the effect of deoxidation, etc., the lower limit value of the Si content, while changing depending on the desired deoxidation level, is generally 0.05%.

[Mn: 0.50 to 2.50%]

Manganese (Mn) raises the hardenability and raises the strength of the hot stamped body. On the other hand, even if including Mn in excess, the effect become saturated. Therefore, the Mn content is 0.50 to 2.50%. The Mn content is preferably 0.60% or more, more preferably 0.70% or more. The Mn content is preferably 2.40% or less, more preferably 2.30% or less.

[P: 0.03% or Less]

Phosphorus (P) is an impurity contained in steel. P segregates at the crystal grain boundaries to cause a drop in the toughness of the steel and causes a drop in the delayed fracture resistance. Therefore, the P content is 0.03% or less. The P content is preferably as small as possible and is preferably 0.02% or less. However, excessive reduction of the P content invites a rise in costs, therefore the P content is preferably 0.0001% or more. The inclusion of P is not essential, therefore the lower limit of the P content is 0%.

[S: 0.010% or Less]

Sulfur (S) is an impurity contained in steel. S forms sulfides to cause a drop in the toughness of the steel and cause a drop in the delayed fracture resistance. Therefore, the S content is 0.010% or less. The S content is preferably as small as possible and is preferably 0.005% or less. However, excessive reduction of the S content invites a rise in costs, therefore the S content is preferably 0.0001% or more. The inclusion of S is not essential, therefore the lower limit of the S content is 0%.

[sol. Al: 0 to 0.10%]

Aluminum (Al) is effective for deoxidation of steel. However, excessive inclusion of Al causes the $Ac_3$ point of the steel material to rise and accordingly the heating temperature of the hot stamping becomes higher and Zn, etc., in the plating layer unavoidably evaporate. Therefore, the Al content is 0.10% or less, preferably 0.05% or less. The Al content may also be 0%, but to obtain the effect of deoxidation, etc., the Al content may be 0.01% or more. In this Description, the Al content means the content of so-called acid-soluble Al (sol. Al).

[N: 0.010% or Less]

Nitrogen (N) is an impurity unavoidably contained in steel. N forms nitrides to cause a drop in the toughness of the steel. If boron (B) is further contained in the steel, N bonds with B to cause a reduction in the amount of B in solid solution and cause a drop in the hardenability. Therefore, the N content is 0.010% or less. The N content is preferably as small as possible and is preferably 0.005% or less. However, excessive reduction of the N content invites a rise in costs, therefore the N content is preferably 0.0001% or more. The inclusion of N is not essential, therefore the lower limit of the N content is 0%.

The basic chemical composition of the steel base material suitable for use in the embodiment according to the present invention is as explained above. Further, the above steel base material may optionally contain one or more of B: 0 to 0.005%, Ti: 0 to 0.10%, Cr: 0 to 0.50%, Mo: 0 to 0.50%, Nb: 0 to 0.10%, and Ni: 0 to 1.00%. Below, these elements will be explained in detail. The inclusion of these element is not essential, therefore the lower limits of the contents of the elements are 0%.

[B: 0 to 0.005%]

Boron (B) raises the hardenability of steel and raises the strength of the steel material after hot stamping, therefore may be included in the steel base material. However, even if including B in excess, the effect becomes saturated. Therefore, the B content is 0 to 0.005%. The B content may also be 0.0001% or more.

[Ti: 0 to 0.10%]

Titanium (Ti) can bond with nitrogen (N) to form nitrides and keep the hardenability from dropping due to formation of BN. Further, due to the pinning effect, Ti can refine the austenite grain size and raise the toughness, etc., of the steel material at the time of heating in hot stamping. However, even if including Ti in excess, the effect becomes saturated. Further, if Ti nitrides precipitate in excess, sometimes the toughness of the steel will fall. Therefore, the Ti content is 0 to 0.10%. The Ti content may be 0.01% or more.

[Cr: 0 to 0.50%]

Chromium (Cr) is effective for raising the hardenability of steel and raising the strength of the hot stamped body. However, if the Cr content is excessive and a large amount of Cr carbides which are difficult to melt at the time of heating in hot stamping are formed, it becomes difficult for the steel to transform to austenite, and conversely the hardenability falls. Therefore, the Cr content is 0 to 0.50%. The Cr content may also be 0.10% or more.

[Mo: 0 to 0.50%]

Molybdenum (Mo) raises the hardenability of steel. However, even if including Mo in excess, the above effect becomes saturated. Therefore, the Mo content is 0 to 0.50%. The Mo content may also be 0.05% or more.

[Nb: 0 to 0.10%]

Niobium (Nb) is an element which forms carbides to refine the crystal grains at the time of hot stamping and raise the toughness of the steel. However, if including Nb in excess, the above effect becomes saturated and further the hardenability falls. Therefore, the Nb content is 0 to 0.10%. The Nb content may also be 0.02% or more.

[Ni: 0 to 1.00%]

Nickel (Ni) is an element able to suppress embrittlement caused by molten Zn at the time of the heating in the hot stamping. However, even if including Ni in excess, the effect becomes saturated. Therefore, the Ni content is 0 to 1.00%. The Ni content may also 0.10% or more.

In the steel base material according to the embodiment of the present invention, the balance other than the above constituents is comprised of Fe and impurities. The "impurities" in the steel base material mean constituents entering due to various factors in the production process, first and foremost the raw materials such as the ore and scrap, when industrially producing the hot stamped body according to the embodiment of the present invention, and not intentionally added to the hot stamped body.

[Plating Layer]

According to the embodiment of the present invention, a plating layer is formed on the surface of the above steel base material. For example, if the steel base material is a steel sheet, the plating layer is formed on at least one surface of the steel sheet, i.e., one surface or both surfaces of the steel sheet. The plating layer comprises an interfacial layer positioned at the interface with the steel base material and containing Fe and Al and a main layer positioned on the interfacial layer. The plating layer has the following average composition.

[Al: 15.00 to 45.00%]

Al is an element essential for suppressing the evaporation of the Zn and Mg at the time of the heating in the hot stamping. As explained above, it is believed that due to the presence of the acicular Al—Zn—Si—Ca phase in the surface structure of the plating layer before the hot stamping, the Ca leaching out from the acicular Al—Zn—Ca phase at the start of the heating in the hot stamping is preferentially oxidized by the oxygen in the atmosphere and a dense Ca-based oxide film, more specifically a Ca- and Mg-containing oxide film, is formed on the outermost surface of the plating layer. Such a Ca-based oxide film is believed to function as a barrier layer for suppressing evaporation of the Zn and Mg. To express the function of the barrier layer, the content of Al in the plating layer after hot stamping has to be 15.00% or more, preferably is 20.00% or more or 25.00% or more. On the other hand, if the Al content is more than 45.00%, $Al_4$ Ca and other intermetallic compounds are preferentially formed at the plating layer before the hot stamping and formation of the acicular Al—Zn—Si—Ca phase in a sufficient amount becomes difficult. Therefore, the Al content is 45.00% or less, preferably 40.00% or less or 35.00% or less.

[Mg: 4.50 to 12.00%]

Mg is an element effective for improving the corrosion resistance of the plating layer and improving the coating blistering, etc. Further, Mg has the effect of forming liquid phase Zn—Mg and suppressing LME cracking at the time of heating in the hot stamping. If the Mg content is low, the possibility of LME occurring increases. From the viewpoint of improvement of the corrosion resistance and suppression of the LME, the Mg content is 4.50% or more, preferably 5.00% or more or 5.50% or more. On the other hand, if the Mg content is too high, an excessive sacrificial corrosion action tends to cause coating blistering and flow rust to rapidly become larger. Therefore, the Mg content is 12.00% or less, preferably 10.00% or less.

[Si: 0.05 to 3.00%]

Si is an element essential for suppressing evaporation of Zn and Mg at the time of the heating in the hot stamping. As explained above, due to the presence of the acicular Al—Zn—Si—Ca phase in the surface structure of the plating layer before the hot stamping, it is possible to form a barrier layer comprised of a Ca-based oxide film for suppressing evaporation of Zn and Mg at the time of heating in the hot stamping. To express the function of the barrier layer, the Si content in the plating layer after hot stamping has to be 0.05% or more, preferably is 0.10% or more or 0.40% or more. On the other hand, if the Si content is excessive, an $Mg_2$ Si phase is formed at the interface of the steel base material and the plating layer at the plating layer before hot stamping and the corrosion resistance greatly deteriorates. Further, if the Si content is excessive, the $Mg_2$ Si phase is preferentially formed at the plating layer before the hot stamping and it becomes difficult to make the acicular Al—Zn—Si—Ca phase form in a sufficient amount. Therefore, the Si content is 3.00% or less, preferably 1.60% or less, more preferably 1.00% or less.

[Ca: 0.05 to 3.00%]

Ca is an element essential for suppressing evaporation of Zn and Mg at the time of heating in the hot stamping. As explained above, due to the presence of the acicular Al—Zn—Si—Ca phase in the surface structure of the plating layer before the hot stamping, it is possible to form a barrier layer comprised of a Ca-based oxide film for suppressing evaporation of Zn and Mg at the time of the heating in the hot stamping. To express the function of the barrier layer, the Ca content in the plating layer after hot stamping has to be 0.05% or more, preferably is 0.40% or more. On the other hand, if the Ca content is excessive, $Al_4$ Ca and other intermetallic compounds are preferentially formed at the plating layer before the hot stamping and it becomes difficult to make the acicular Al—Zn—Si—Ca phase form in a sufficient amount. Therefore, the Ca content is 3.00% or less, preferably 2.00% or less, more preferably 1.50% or less.

[Fe: 20.00 to 50.00%]

If heating the plated steel material at the time of hot stamping, the Fe from the steel base material diffuses in the plating layer, therefore the plating layer inevitably contains Fe. Fe bonds with the Al in the plating layer to form at the interface with the steel base material an interfacial layer mainly comprised of an intermetallic compound containing Fe and Al and further form an Fe—Al containing phase in the main layer positioned on the interfacial layer. If the Fe content is low, the amount of the Fe—Al containing phase decreases, therefore the structure of the main layer easily collapses. More specifically, if the Fe content is low, the Zn and Mg contents relatively increase, therefore at the time of the heating in the hot stamping, these elements easily evaporate and as a result hydrogen penetration easily occurs. Therefore, the Fe content is 20.00% or more, preferably 25.00% or more. On the other hand, if the Fe content is too high, the amount of the Fe—Al containing phase in the main layer becomes greater and the amount of the Mg—Zn containing phase in the main layer relatively decreases, therefore the corrosion resistance falls. Therefore, the Fe content is 50.00% or less, preferably 45.00% or less, more preferably 40.00% or less.

The chemical composition of the plating layer is as explained above. Furthermore, the plating layer may optionally contain one or more of Sb: 0 to 0.50%, Pb: 0 to 0.50%, Cu: 0 to 1.00%, Sn: 0 to 1.00%, Ti: 0 to 1.00%, Sr: 0 to 0.50%, Cr: 0 to 1.00%, Ni: 0 to 1.00%, and Mn: 0 to 1.00%. While not particularly limited to this, from the viewpoint of causing the actions and functions of the above basic constituents forming the plating layer to be sufficiently manifested, the total content of these elements is preferably 5.00% or less, more preferably 2.00% or less. Below, these elements will be explained in detail.

[Sb: 0 to 0.50%, Pb: 0 to 0.50%, Cu: 0 to 1.00%, Sn: 0 to 1.00%, and Ti: 0 to 1.00%]

Sb, Pb, Cu, Sn, and Ti can be contained in the Mg—Zn containing phase present in the main layer, but if within predetermined ranges of contents, do not detrimentally affect the performance of the hot stamped body. However, if the contents of the elements are excessive, at the time of the heating in the hot stamping, sometimes oxides of these elements will precipitate and cause deterioration of the surface properties of the hot stamped body and the phosphate treatment will become poor and the corrosion resistance after coating will deteriorate. Furthermore, if the Pb and Sn contents become excessive, the LME resistance will tend to fall. Therefore, the contents of Sb and Pb are 0.50% or less, preferably 0.20% or less, while the contents of Cu, Sn, and Ti are 1.00% or less, preferably 0.80% or less, more preferably 0.50% or less. On the other hand, the contents of elements may also be 0.01% or more. These elements are not essential. The lower limits of the contents of these elements are 0%.

[Sr: 0 to 0.50%]

Sr can be included in the plating bath at the time of production of the plating layer so as to suppress the formation of the top dross formed on the plating bath. Further, Sr tends to suppress oxidation by air at the time of heating in hot stamping, therefore can suppress color changes in the body after hot stamping. These effects are exhibited even in small amounts, therefore the Sr content may be 0.01% or more. On the other hand, if the Sr content is excessive, the occurrence of coating blistering and flow rust becomes larger and the corrosion resistance tends to deteriorate. Therefore, the Sr content is 0.50% or less, preferably 0.30% or less, more preferably 0.10% or less.

[Cr: 0 to 1.00%, Ni: 0 to 1.00%, and Mn: 0 to 1.00%]

Cr, Ni, and Mn concentrate near the interface of the plating layer and the steel base material and have the effect of eliminating spangles of the plating layer surface, etc. To obtain such an effect, the contents of Cr, Ni, and Mn are preferably respectively 0.01% or more. On the other hand, these elements may be included in the interfacial layer or included in the Fe—Al containing phase present in the main layer. However, if the contents of these elements are excessive, the coating blistering and flow rust become greater and the corrosion resistance tends to deteriorate. Therefore, the contents of Cr, Ni, and Mn are respectively 1.00% or less, preferably 0.50% or less, more preferably 0.10% or less.

[Balance: Zn and Impurities]

The balance in the plating layer aside from the above constituents is comprised of Zn and impurities. Zn is an essential constituent in the plating layer from the viewpoint of preventing corrosion. Zn is present mainly as the Mg—Zn containing phase in the main layer of the plating layer and greatly contributes to improvement of the corrosion resistance. If the Zn content is less than 3.00%, sometimes a sufficient corrosion resistance cannot be maintained. Therefore, the Zn content is preferably 3.00% or more. The lower limit of the Zn content may be 10.00%, 15.00%, or 20.00%. On the other hand, if the Zn content is too high, at the time of the heating in the hot stamping, Zn easily evaporates and as a result LME and hydrogen penetration easily occur. Therefore, the Zn content is preferably 50.00% or less. The upper limit of the Zn content may be 45.00%, 40.00%, or 35.00%. Further, Zn can be substituted by Al, therefore a small amount of Zn can form a solid solution with the Fe in the Fe—Al containing phase. Further, the "impurities" in the plating layer mean constituents entering due to various factors in the production process, first and foremost the raw materials, when producing the plating layer, and not intentionally added to the plating layer. In the plating layer, the impurities may contain elements other than the elements explained above in trace amounts to an extent not detracting from the effect of the present invention.

The chemical composition of the plating layer is determined by dissolving the plating layer in an acid solution to which an inhibitor is added for inhibiting corrosion of the steel base material and measuring the obtained solution by the ICP (high frequency inductively coupled plasma) emission spectrometry method. In this case, the measured chemical composition is the average composition of the total of the main layer and the interfacial layer.

The thickness of the plating layer may be, for example, 3 to 50 μm. Further, if the steel base material is a steel sheet, the plating layer may be provided at both surfaces of the steel sheet or may be provided at only one surface. The amount of deposition of the plating layer is not particularly limited, but for example may be 10 to 170 $g/m^2$ per surface. The lower limit may be 20 or 30 $g/m^2$ and the upper limit may be 150 or 130 $g/m^2$. In the present invention, the amount of deposition of the plating layer is determined from the change in weight before and after acid washing by dissolving the plating layer in an acidic solution to which an inhibitor for inhibiting corrosion of the base iron has been added.

[Interfacial Layer]

The interfacial layer is a layer containing Fe and Al, more specifically a layer at which, at the time of the heating in the hot stamping, the Fe from the steel base material diffuses in the plating layer and bonds with the Al in the plating layer and is mainly comprised of an intermetallic compound containing Fe and Al.

[Main Layer]

The main layer includes an area ratio of 10.0 to 85.0% of an Mg—Zn containing phase and 15.0 to 90.0% of an Fe—Al containing phase. The main layer has the effect of inhibiting the formation of scale at the time of hot stamping and contributes to corrosion resistance of the hot stamped body as well. The main layer has a mixed structure of an Mg—Zn containing phase and Fe—Al containing phase and generally, as shown in FIG. 2, has the structure (island-in-sea structure) of a matrix phase of an Mg—Zn containing phase 8 in which islands of Fe—Al containing phase 9 are present, in particular are present dispersed. If referring to FIG. 2, the islands of the Fe—Al containing phase 9 include not only the islands of the FeAl phase 9a, but also groups of islands of the FeAl phase 9a, etc., adjoining each other.

[Mg—Zn Containing Phase]

In an embodiment according to the present invention, by configuring the plating layer after hot stamping so that Zn and Mg having a corrosion resistance improving effect are present as an Mg—Zn containing phase in the main layer in an area ratio of an amount of 10.0 to 85.0%, occurrence of LME and hydrogen penetration to the steel material due to the heating at the time of hot stamping can be remarkably reduced or suppressed and, even in the body after hot stamping, sufficient corrosion resistance can be achieved. If the area ratio of the Mg—Zn containing phase is less than 10.0%, it is not possible to sufficiently obtain such an effect. Therefore, the area ratio of the Mg—Zn containing phase is 10.0% or more, preferably 15.0% or more, more preferably 25.0% or more. On the other hand, the area ratio of the Mg—Zn containing phase may be 85.0% or less, for example, may be 80.0% or less, 75.0% or less, or 70.0% or less.

The Mg—Zn containing phase includes at least one phase selected from the group consisting of an MgZn phase, $Mg_2Zn_3$ phase, and $MgZn_2$ phase. Here, the MgZn phase, $Mg_2Zn_3$ phase, and $MgZn_2$ phase are intermetallic compounds, therefore while the atomic ratios of Mg and Zn of the phases may be considered to be substantially constant, in actuality they fluctuate somewhat since sometimes Al, Fe, etc., dissolve partially. Therefore, in the present invention, in phases having a chemical composition in which the total of the Mg and Zn contents is 90.0% or more, a phase where the atomic ratio of Mg/Zn is 0.90 to 1.10 is defined as an MgZn phase, a phase where an atomic ratio of Mg/Zn is 0.58 to 0.74 is defined as an $Mg_2Zn_3$ phase, and a phase where an atomic ratio of Mg/Zn is 0.43 to 0.57 is defined as an $MgZn_2$ phase. By the Mg—Zn containing phase including these phases, the corrosion resistance of the hot stamped body can be remarkably improved. In particular, when the Mg—Zn containing phase includes an MgZn phase and/or $Mg_2\,Zn_3$ phase, it is possible to suppress LME at the time of hot stamping. To reliably obtain such an effect, the Mg—Zn containing phase preferably includes an MgZn phase with a large Mg content. The area ratio of the MgZn phase in the main layer is preferably 5.0% or more and 10.0% or more is more preferable. 30.0% or more or 40.0% or more is also possible. Further, the Mg—Zn containing phase preferably includes an MgZn phase and $Mg_2\,Zn_3$ phase. The area ratio of the total of the MgZn phase and $Mg_2\,Zn_3$ phase in the main layer is preferably 10.0% or more or 25.0% or more. 40.0% or more or 50.0% or more is also possible. On the other hand, it may be 85.0% or less, 80.0% or less, 75.0% or less, or 70.0% or less. By controlling the Mg—Zn containing phase to within such a range, it is possible to remarkably reduce or suppress the occurrence of LME and hydrogen penetration to the steel material occurring due to the heating at the time of hot stamping and possible, even in the body after hot stamping, to achieve sufficient corrosion resistance.

[Fe—Al Containing Phase]

As explained above, the main layer includes an area ratio of 15.0 to 90.0% of an Fe—Al containing phase. If the area ratio of the Fe—Al containing phase is more than 90.0%, the amount of the Mg—Zn containing phase contained in the main layer becomes smaller and the corrosion resistance falls. On the other hand, the area ratio of the Fe—Al containing phase may be 15.0% or more, for example, may be 20.0% or more or 25.0% or more. The Fe—Al containing phase becomes a barrier at the time corrosion progresses in the Mg—Zn containing phase, therefore by establishing the presence of the Fe—Al containing phase, the corrosion resistance can be improved. Explaining this in more detail, the Fe—Al containing phase (Fe—Al—Zn phase and FeAl phase) is present in the main layer not as a laminar structure, but as island structures, therefore if corrosion progresses in the Mg—Zn containing phase having the corrosion resistance improving effect, the corrosion will proceed in a spotted state avoiding these islands of the Fe—Al containing phase. As a result, it is believed possible to delay progress of corrosion of the Mg—Zn containing phase.

The Fe—Al containing phase includes the Fe—Al—Zn phase and FeAl phase. The area ratio of the Fe—Al—Zn phase in the main layer is more than 10.0% or less. In the present invention, the Fe—Al containing phase means a phase having a chemical composition where the total of Fe, Al, and Zn is 90.0% or more. In the Fe—Al containing phase having such a chemical composition, a phase where the Zn content is 1.0% or more is defined as an Fe—Al—Zn phase and a phase where the Zn content is less than 1.0% is defined as an FeAl phase. While not intending to be bound by any specific theory, it is believed that the Fe—Al—Zn phase and FeAl phase do not grow at the interface of the plating layer and the steel base material from the steel base material to inside the plating layer in a layer shape, but form nuclei of spherical shapes in the plating layer in the molten state at the time of the heating in the hot stamping and then grow into island shapes.

As explained in detail later, by suitably controlling the production conditions of the plated steel material before hot stamping, it is possible to establish the presence of the acicular Al—Zn—Si—Ca phase dispersed in the surface structure of the plating layer. As a result, it is possible to suppress the evaporation of Zn and Mg at the time of the heating in the hot stamping. By suppressing the evaporation of Zn and Mg, it is believed that nuclei are formed inside the main layer in the molten state and the Fe—Al containing phase grows to island shapes. As explained above, the Fe—Al containing phase, in particular the Fe—Al—Zn phase and FeAl phase, has island shapes. While not particularly limited, the aspect ratio almost never is more than 5.0. In general, the Fe—Al containing phase has island shapes of an aspect ratio of 5.0 or less, for example, 4.0 or less or 3.0 or less. The lower limit of the aspect ratio is not particularly prescribed, but, for example, may be 1.0 or more, 1.2 or more, or 1.5 or more. In the present invention, the "aspect ratio" means the ratio of the longest axis of the Fe—Al containing phase (Fe—Al—Zn phase and FeAl phase) (long axis) and the longest axis in the axes of the Fe—Al containing phase perpendicular to the same (short axis).

As explained above, the FeAl phase contained in the Fe—Al containing phase is present in a relatively large amount near the interface of the plating layer and Fe—Al layer, while the Fe—Al—Zn phase is present in a relatively large amount near the surface of the plating layer. In such a case, at the time of the heating in the hot stamping, water vapor in the atmosphere is reduced by the Al in the Fe—Al—Zn phase and hydrogen is generated. Therefore, in an embodiment according to the present invention, by limiting the Fe—Al—Zn phase in the main layer to an area ratio of 10.0% or less in range, it is possible to reduce the amount of hydrogen generated due to the Fe—Al—Zn phase. As a result, compared with when just controlling the amount of the Mg—Zn containing phase in the main layer, it becomes possible to further improve the hydrogen penetration resistance of the hot stamped body.

Further, by suitably adjusting the heat treatment in the hot stamping, it is possible to control the contents of the Fe—Al—Zn phase and FeAl phase in the main layer. In an embodiment according to the present invention, the area ratio of the Fe—Al—Zn phase in the main layer is preferably 8.0% or less, more preferably 5.0% or less, most preferably 3.0% or less and may also be 0%. Further, in an embodiment according to the present invention, the area ratio of the FeAl phase in the main layer may for example, be 5.0% or more, 10.0% or more, 15.0% or more, or 20.0% or more and may be 80.0% or less, 70.0% or less, 55.0% or less, or 40.0% or less.

[Other Intermetallic Compounds]

The main layer may contain other intermetallic compounds besides those contained in the Mg—Zn containing phase and Fe—Al containing phase. The other intermetallic compounds are not particularly limited, but, for example, intermetallic compounds containing Si and Ca or other elements contained in the plating layer, specifically $Mg_2$ Si, $Al_4$ Ca, etc., may be mentioned. However, if the area ratio of the other intermetallic compounds in the main layer becomes too large, sometimes it is not possible to sufficiently secure the Mg—Zn containing phase and/or Fe—Al containing phase. Therefore, the area ratio of the other intermetallic compounds, for example, the area ratio of the $Mg_2$ Si and $Al_4$ Ca, is preferably a total of 10.0% or less. 5.0% or less is more preferable.

[Oxide Layer]

The surface of the plating layer is sometimes formed with an oxide layer due to oxidation of the plating constituents. Such an oxide layer is liable to cause a drop in the chemical convertibility and electrodeposition coatability after hot stamping. Therefore, the thickness of the oxide layer is preferably small. For example, it is preferably 1.0 μm or less. If the Zn and Mg evaporate at the time of hot stamping, a thick Mg—Zn containing oxide layer of more than 1.0 μm is formed.

[Fe—Al Layer]

In an embodiment according to the present invention, as shown in FIG. 2, sometimes an Fe—Al layer 7 is formed beneath the main layer 6. The Fe—Al layer contains mainly Fe and Al. More specifically, it is believed that the Fe—Al layer is formed by further diffusion of the metal elements of the above-explained interfacial layer and the diffusion layer positioned beneath the interfacial layer due for example to the relatively long heat treatment in the hot stamping. If the Fe—Al layer becomes too thick, the Al constituent in the plating layer, in particular the main layer, becomes too small, so this is not preferable. Therefore, the thickness of the Fe—Al layer is generally 25.0 μm or less, preferably 20.0 μm or less, more preferably 15.0 μm or less, most preferably 10.0 μm or less.

The thicknesses of the plating layer, the Fe—Al layer, and the oxide layer are determined by cutting out a test piece from the hot stamped body, burying it in a resin, etc., then polishing the cross-section and measuring the image observed by an SEM. Further, if examining these in a backscattered electron image of the SEM, the contrast at the time of observation will differ depending on the metal constituents, therefore it is possible to identify the layers and confirm the thicknesses of the layers. The thicknesses of the plating layer, the Fe—Al layer, and the oxide layer are determined by performing similar observation in three or more different fields and finding the averages of these.

In the present invention, the area ratios of the phases of the main layer are determined in the following way. First, a prepared sample is cut into a 25 mm×15 mm size, and any cross-section of the plating layer is photographed by a power of 1500× by a scanning electron microscope (SEM). From the BSE image of the same and an SEM-EDS mapping image, the area ratios of the phases at the main layer were measured by computer image processing. The averages of the measurement values at any five fields (however, the measured areas in the fields are 400 $\mu m^2$ or more) were determined as the area ratios of the MgZn phase, $Mg_2$ $Zn_3$ phase, $MgZn_2$ phase, FeAl phase, Fe—Al—Zn phase, and other intermetallic compounds. Further, the area ratio of the Mg—Zn containing phase was determined as the area ratio of the total of the MgZn phase, $Mg_2$ $Zn_3$ phase, and $MgZn_2$ phase. Similarly, the area ratio of the Fe—Al containing phase was determined as the area ratio of the total of the FeAl phase and Fe—Al—Zn phase.

<Method for Producing Hot Stamped Body>

Next, a preferred method for producing the hot stamped body according to the embodiment of the present invention will be explained. The following explanation is intended to illustrate a characteristic method for producing a hot stamped body according to the embodiment of the present invention and is not intended to limit the hot stamped body to one produced by a production method as explained below.

The above production method comprises forming the steel base material, forming a plating layer on the steel base material, and hot stamping (hot pressing) the steel base material on which the plating layer is formed. Below, each step will be explained in detail.

[Step of Forming Steel Base Material]

In the step of forming the steel base material, for example, first, molten steel having the same chemical composition as that explained for the steel base material is produced. The produced molten steel is used to produce a slab by a casting method. Alternatively, the produced molten steel may be used to produce an ingot by the ingot making method. Next, the slab or ingot is hot rolled to produce the steel base material (hot rolled steel sheet). In accordance with need, the hot rolled steel sheet may be pickled, then the hot rolled steel sheet may be cold rolled. The obtained cold rolled steel sheet may be used as the steel base material.

[Step of Forming Plating Layer]

Next, in the step of forming the plating layer, a plating layer having the predetermined chemical composition is formed on at least one surface of the steel base material, preferably on both surfaces.

More specifically, first, the above steel base material is reduced by heating in an $N_2$—$H_2$ mixed gas atmosphere at a predetermined temperature and time, for example, a temperature of 750 to 850° C., then is cooled in a nitrogen atmosphere or other inert atmosphere until near the plating bath temperature. Next, the steel base material is dipped in a plating bath having a predetermined chemical composition for 0.1 to 60 seconds, then is pulled up and adjusted in amount of deposition of the plating layer to within a predetermined range by immediately blowing $N_2$ gas or air by the gas wiping method.

Further, the amount of deposition of the plating layer is preferably 10 to 170 g/m² per surface. In the present step, as an aid to plating deposition, it is also possible to apply Ni preplating, Sn preplating, or other preplating. However, these preplatings cause changes in the alloying reactions, therefore the amount of deposition of the preplating is preferably 2.0 g/m² per surface or less.

Figure 3:
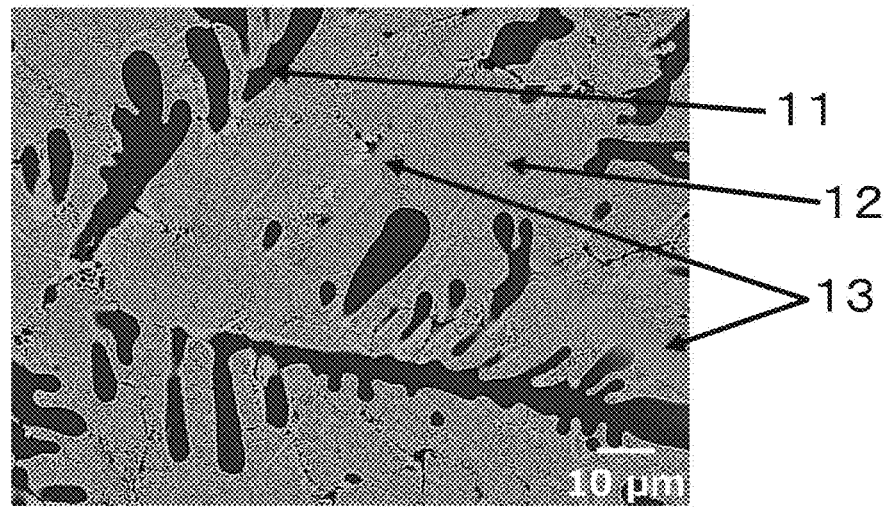
FIG. 3 shows a backscattered electron image (BSE image) of a scanning electron microscope (SEM) of a plating layer surface before hot stamping in a hot stamped body according to the present invention.

Finally, the steel base material on which the plating layer is deposited is cooled, whereby the plating layer is formed on one surface or both surfaces of the steel base material. In the present method, at the time of this cooling, it is important to form the acicular Al—Zn—Si—Ca phase of the intermetallic compound comprised of mainly Al, Zn, Si, and Ca in the surface structure of the plating layer. FIG. 3 shows a backscattered electron image (BSE image) of a scanning electron microscope (SEM) of the plating layer surface before hot stamping of the hot stamped body according to the present invention. Referring to FIG. 3, it will be understood that in the surface structure of the plating layer, in addition to an α phase 11 (dendrite structure in FIG. 3) and α/τ eutectic phase 12, the acicular Al—Zn—Si—Ca phase 13 is present in a relatively large amount. The α phase is a structure mainly comprised of Al and Zn, while the τ phase is a structure mainly comprised of Mg, Zn, and Al.

While not intending to be bound by any specific theory, it is believed that the acicular Al—Zn—Si—Ca phase 13 shown in FIG. 3 functions as the supply source of Ca for forming a Ca-based oxide film at the start of heating in the hot stamping. More specifically, it is believed that due to the presence of the acicular Al—Zn—Si—Ca phase 13 in the surface structure of the plating layer before the hot stamping, the Ca leaching out from the acicular Al—Zn—Si—Ca phase 13 at the start of the heating in the hot stamping is preferentially oxidized by the oxygen in the atmosphere and forms a dense Ca-based oxide film, more specifically a Ca- and Mg-containing oxide film, at the surface-most part of the plating layer. It is believed that such a Ca-based oxide film functions as a barrier layer for suppressing evaporation of Zn and Mg. In particular, by the acicular Al—Zn—Si—Ca phase 13 being present in a predetermined amount, more specifically an area ratio of 2.0% or more, in the surface structure of the plating layer, such a function as a barrier layer is effectively exhibited. Therefore, it is possible to reduce or suppress the evaporation of Zn and Mg in the plating layer to the outside and penetration of hydrogen from the outside at the time of hot stamping and further possible to remarkably suppress the drop in corrosion resistance due to evaporation of Zn and Mg to the outside.

In the present method, suitably controlling the cooling conditions at the time of solidification of the plating layer in the liquid phase state, more specifically cooling the steel base material on which the plating layer is deposited in two stages, is extremely important for the acicular Al—Zn—Si—Ca phase to be formed in a predetermined amount in the surface structure of the plating layer. Explained in more detail, the specific value of the cooling speed can change in accordance with the chemical composition, etc., of the plating layer, but to make the acicular Al—Zn—Si—Ca phase be reliably formed in a predetermined amount, it is effective to first cool the steel base material on which the plating layer is deposited by a 14° C./s or more, preferably 15° C./s or more, average cooling speed from the bath temperature (in general, 500 to 700° C.) down to 450° C., then cool it by a 5.5° C./s or less, preferably 5° C./s or less, average cooling speed from 450° C. to 350° C. By such cooling conditions, i.e., by two-stage cooling of fast cooling and slow cooling, at the time of the first fast cooling, a supersaturated state is created to produce a state in which nuclei of the acicular Al—Zn—Si—Ca phase can easily form and a large amount of nuclei is formed and, at the time of the next slow cooling, the nuclei is made to slowly grow, whereby an area ratio of 2.0% or more of the acicular Al—Zn—Si—Ca phase is formed in the surface structure of the plating layer, in particular is formed dispersed. As a result, even in the case of a heating temperature of 900° C. or more in hot stamping, it becomes possible to suppress evaporation of Zn and Mg and is possible to remarkably reduce or suppress LME and hydrogen penetration into the steel material and achieve sufficient corrosion resistance even in a body after hot stamping. On the other hand, if not performing the above two-stage cooling, it is not possible to form the acicular Al—Zn—Si—Ca phase in the surface structure of the plating layer or not possible to form it in a sufficient amount, therefore at the time of the heating in the hot stamping, much of the Zn and Mg in the plating layer evaporates. Part of the evaporated Zn and Mg is deposited as oxides on the steel base material. In general, a thick Mg—Zn containing oxide layer of more than 1.0 μm, for example, 2.0 μm or more or 3.0 μm or more, is formed. As a result, the LME resistance, hydrogen penetration resistance, and corrosion resistance of the obtained hot stamped body greatly fall. Further, if an acicular Al—Zn—Si—Ca phase is formed, but the amount formed is not necessarily sufficient, sometimes the desired area ratio of the Mg—Zn containing phase or Fe—Al containing phase cannot be achieved.

If the point of change of the cooling speed of the fast cooling and slow cooling becomes higher than about 450° C., sometimes nuclei of the acicular Al—Zn—Si—Ca phase are not sufficiently formed. On the other hand, if the point of change of the cooling speed becomes lower than about 450° C., sometimes the nuclei formed cannot be made to sufficiently grow. Whatever the case, it becomes difficult to render the acicular Al—Zn—Si—Ca phase present in a predetermined amount, more specifically an area ratio of 2.0% or more in amount in the surface structure of the plating layer. Therefore, the point of change of the cooling speed, as explained later, has to be selected from 425 to 475° C. in range. To reliably form 2.0% or more of the acicular Al—Zn—Si—Ca phase, as explained above, 450° C. is preferable.

[Step of Hot Stamping (Hot Pressing)]

Finally, in the step of hot stamping (hot pressing), the steel base material provided with the plating layer is hot pressed. The present step is performed by loading the steel base material provided with the plating layer in a heating furnace, holding it for a predetermined holding time after reaching 900° C., then hot pressing it. The above "holding time" means the holding time from 900° C. or more to less than 1000° C. after reaching 900° C. The specific value of the holding time can change according to the holding temperature and the chemical composition of the plating layer, etc., but in general is more than 4 minutes. To reliably obtain the hot stamped body according to the embodiment of the present invention having the plating layer provided with the main layer including the above explained Mg—Zn containing phase and Fe—Al containing phase, the time is 4.5 minutes or more and 6 minutes or less or 7 minutes or less.

EXAMPLES

Below, examples will be used to explain the present invention in more detail, but the present invention is not limited to these examples in any way.

Example A

In the present example, various hot stamped bodies according to embodiments of the present invention were produced under various conditions and were investigated for characteristics.

First, molten steel comprising, by mass %, a C content of 0.20%, Si content of 0.20%, Mn content of 1.30%, P content of 0.01%, S content of 0.005%, sol. Al content of 0.02%, N content of 0.002%, B content of 0.002%, Ti content of 0.02%, Cr content of 0.20%, and balance of Fe and impurities was used to produce a slab by continuous casting. Next, the slab was hot rolled to produce hot rolled steel sheet, the hot rolled steel sheet was pickled, then the sheet was cold rolled to produce a cold-rolled steel sheet (steel base material) having a 1.4 mm sheet thickness.

Next, the produced steel base material was cut to 100 mm×200 mm, then the steel base material was plated using a batch type hot dip coating apparatus made by Rhesca. More specifically, first, the produced steel base material was reduced by heating in a furnace with an oxygen concentration of 20 ppm or less in an $N_2$-5% $H_2$ mixed gas atmosphere at 800° C., then was cooled in $N_2$ down to the plating bath temperature+20° C. Next, the steel base material was dipped in a plating bath having a predetermined chemical composition for about 3 seconds, then was pulled up by a pull-up speed of 20 to 200 mm/s and adjusted by $N_2$ gas wiping to an amount of deposition of the plating layer of the value shown in Table 1. Next, the steel base material on which the plating layer was deposited was cooled in two stages under the conditions shown in Table 1, whereby a plated steel material on the two surfaces of which a plating layer was formed was obtained. The sheet temperature was measured using a thermocouple spot welded to the center part of the steel base material.

Next, the obtained plated steel material was hot stamped. Specifically, the hot stamping was performed by loading the plated steel material into a heating furnace, then heating it to a temperature of 900° C. and holding it there for a predetermined time, then hot pressing it by a die equipped with a water cooling jacket. As the heat treatment conditions at the time of hot stamping (HS), either of the following conditions X and Y was selected. The quenching by the die was controlled to give a cooling speed of 50° C./s or more up to about the martensite transformation start point (410° C.).

X: Holding at 900° C. for 4.5 minutes
Y: Holding at 900° C. for 6 minutes

[Table 1]

TABLE 1

| | | Chemical composition of plating layer (mass%) | | | | | | | Amount of deposition of plating layer per surface ($g/m^2$) | Method of production | | | HS heat treatment |
|---|---|---|---|---|---|---|---|---|---|---|---|---|---|
| | | | | | | | | | | Bath temperature (° C.) | Bath temperature cooling speed to 450° C. average (° C./s) | 450 to 350° C. speed average cooling (° C./s) | |
| No. | Class | Zn | Al | Mg | Si | Ca | Fe | Others Type | Total value | | | | | |
| 1 | Comp. ex. | 8.25 | 15.10 | 0.10 | 0.03 | 0.02 | 76.50 | — | 0.00 | 0.5 | 520 | 15.0 | 5.0 | X |
| 2 | Comp. ex. | 10.63 | 13.10 | 0.20 | 0.04 | 0.01 | 76.00 | Pb:0.02 | 0.02 | 2.1 | 520 | 15.0 | 5.0 | X |
| 3 | Example | 42.48 | 15.00 | 6.40 | 0.32 | 0.80 | 35.00 | — | 0.00 | 50.4 | 530 | 15.0 | 5.0 | X |
| 4 | Comp. ex. | 26.79 | 20.60 | 15.50 | 0.32 | 0.79 | 36.00 | — | 0.00 | 50.4 | 570 | 15.0 | 5.0 | X |
| 5 | Comp. ex. | 9.51 | 14.10 | 0.30 | 0.05 | 0.04 | 76.00 | — | 0.00 | 1.8 | 530 | 15.0 | 5.0 | X |
| 6 | Example | 41.74 | 18.50 | 4.50 | 0.30 | 0.76 | 34.00 | Ni:0.20 | 0.20 | 50.4 | 580 | 15.0 | 5.0 | X |
| 7 | Example | 40.05 | 18.50 | 5.10 | 0.30 | 0.55 | 35.50 | — | 0.00 | 41.2 | 580 | 15.0 | 5.0 | X |
| 8 | Example | 34.34 | 22.50 | 5.40 | 0.30 | 0.66 | 36.50 | Mn:0.30 | 0.30 | 21.5 | 580 | 15.0 | 5.0 | X |
| 9 | Example | 31.64 | 23.00 | 6.50 | 0.30 | 0.76 | 37.80 | — | 0.00 | 120.0 | 580 | 15.0 | 5.0 | Y |
| 10 | Example | 31.88 | 23.00 | 5.90 | 0.37 | 0.74 | 38.10 | Sr:0.01 | 0.01 | 18.0 | 580 | 15.0 | 5.0 | X |
| 11 | Example | 33.16 | 23.10 | 5.90 | 0.30 | 0.44 | 37.10 | — | 0.00 | 25.5 | 580 | 15.0 | 5.0 | X |
| 12 | Example | 30.62 | 23.50 | 6.10 | 0.40 | 0.88 | 38.50 | — | 0.00 | 36.0 | 580 | 15.0 | 5.0 | X |
| 13 | Example | 28.65 | 23.50 | 6.20 | 0.41 | 0.07 | 41.10 | Sb:0.07 | 0.07 | 21.0 | 580 | 15.0 | 5.0 | X |
| 14 | Example | 27.35 | 23.47 | 6.20 | 0.42 | 0.76 | 41.00 | Ni:0.80 | 0.80 | 43.2 | 580 | 15.0 | 5.0 | Y |
| 15 | Comp. ex. | 42.30 | 25.10 | 11.50 | 0.40 | 0.70 | 20.00 | — | 0.00 | 41.2 | 620 | 9.0 | 5.0 | X |
| 16 | Comp. ex. | 1.74 | 22.00 | 0.20 | 0.05 | 0.01 | 76.00 | — | 0.00 | 1.1 | 580 | 15.0 | 15.0 | X |
| 17 | Comp. ex. | 2.05 | 22.00 | 0.10 | 0.04 | 0.01 | 75.80 | — | 0.00 | 1.3 | 580 | 5.0 | 5.0 | X |
| 18 | Comp. ex. | 2.44 | 22.05 | 0.15 | 0.05 | 0.01 | 75.30 | — | 0.00 | 1.0 | 580 | 15.0 | 7.0 | X |
| 19 | Comp. ex. | 30.30 | 22.10 | 8.30 | 3.10 | 0.10 | 36.10 | — | 0.00 | 20.6 | 580 | 15.0 | 5.0 | X |
| 20 | Comp. ex. | 28.80 | 20.50 | 8.30 | 0.40 | 3.20 | 38.80 | — | 0.00 | 20.8 | 580 | 15.0 | 5.0 | X |
| 21 | Example | 21.02 | 25.60 | 6.10 | 0.30 | 0.88 | 46.10 | — | 0.00 | 41.1 | 580 | 15.0 | 5.0 | X |
| 22 | Example | 20.98 | 25.40 | 6.00 | 0.30 | 0.90 | 46.40 | Pb:0.02 | 0.02 | 43.5 | 580 | 15.0 | 5.0 | X |
| 23 | Example | 21.50 | 28.80 | 6.00 | 0.30 | 0.90 | 42.50 | — | 0.00 | 22.2 | 580 | 15.0 | 5.0 | X |
| 24 | Example | 17.57 | 30.50 | 12.00 | 0.10 | 0.40 | 39.40 | Cr:0.03 | 0.03 | 21.5 | 640 | 15.0 | 5.0 | X |
| 25 | Example | 20.85 | 32.50 | 6.50 | 0.05 | 0.50 | 39.60 | — | 0.00 | 144.0 | 630 | 15.0 | 5.0 | Y |
| 26 | Example | 18.05 | 33.50 | 6.70 | 0.70 | 0.55 | 39.80 | Cu:0.70 | 0.70 | 33.8 | 630 | 15.0 | 5.0 | X |
| 27 | Example | 16.30 | 35.10 | 6.70 | 0.70 | 1.50 | 39.70 | — | 0.00 | 34.5 | 630 | 15.0 | 5.0 | X |
| 28 | Example | 11.59 | 37.80 | 6.70 | 0.80 | 3.00 | 40.10 | Ti:0.01 | 0.01 | 45.5 | 650 | 15.0 | 5.0 | X |
| 29 | Example | 11.82 | 39.10 | 6.50 | 0.80 | 0.73 | 41.06 | — | 0.00 | 72.0 | 650 | 15.0 | 5.0 | X |
| 30 | Example | 10.75 | 40.00 | 6.00 | 1.00 | 0.70 | 41.50 | Sn:0.05 | 0.05 | 40.1 | 680 | 15.0 | 5.0 | X |
| 31 | Example | 8.00 | 40.00 | 5.00 | 1.00 | 1.00 | 45.00 | — | 0.00 | 40.6 | 680 | 15.0 | 5.0 | X |
| 32 | Comp. ex. | 6.68 | 45.10 | 5.00 | 0.56 | 0.56 | 42.10 | — | 0.00 | 39.6 | 690 | 15.0 | 5.0 | X |
| 33 | Comp. ex. | Commercially available hot dip galvannealed steel sheet | | | | | | | | | | | | X |
| 34 | Comp. ex. | Commercially available hot dip Al coated steel sheet | | | | | | | | | | | | X |

Bold underlines indicate outside scope of present invention or outside preferable range.

[Table 2]

TABLE 2

| No. | Class | Fe-Al layer layer + diffusion layer) (interfacial Thickness (μm) | Main layer Mg-Zn containing phase (%) Total MgZn Area ratio | MgZn Area ratio | MgZn3 Area ratio | MgZn2 Area ratio | Fe-Al containing phase (%) Total Area ratio | Fe-Al-Zn phase Area ratio | FeAl phase Area ratio | Other compounds intermetallic Area ratio | Mg-Zn containing oxide layer Thickness (μm) | Results of evaluation LME | Corrosion resistance | Hydrogen penetration |
|---|---|---|---|---|---|---|---|---|---|---|---|---|---|---|
| 1 | Comp. ex. | 22.1 | 0.0 | 0.0 | 0.0 | 0.0 | 0.0 | 0.0 | 0.0 | 0.0 | 2.1 | D | C | D |
| 2 | Comp. ex. | 23.5 | 0.0 | 0.0 | 0.0 | 0.0 | 0.0 | 0.0 | 0.0 | 0.0 | 2.1 | D | C | D |
| 3 | Example | 5.1 | 79.7 | 0.0 | 6.2 | 73.5 | 20.3 | 0.1 | 20.2 | 0.0 | <0.2 | B | B | A |
| 4 | Comp. ex. | 5.8 | 85.5 | 81.2 | 4.3 | 0.0 | 14.5 | 2.0 | 12.5 | 0.0 | <0.2 | A | C | C |
| 5 | Comp. ex. | 25.1 | 0.0 | 0.0 | 0.0 | 0.0 | 0.0 | 0.0 | 0.0 | 0.0 | 3.0 | D | C | D |
| 6 | Example | 5.0 | 74.6 | 0.0 | 0.0 | 74.6 | 25.2 | 0.0 | 25.2 | 0.2 | <0.2 | A | A | A |
| 7 | Example | 5.0 | 74.0 | 20.5 | 53.5 | 0.0 | 26.0 | 1.0 | 25.0 | 0.0 | <0.2 | A | A | AA |
| 8 | Example | 5.3 | 72.9 | 20.2 | 52.7 | 0.0 | 27.0 | 1.0 | 26.0 | 0.1 | <0.2 | A | A | AA |
| 9 | Example | 5.3 | 72.4 | 47.8 | 11.6 | 13.0 | 27.6 | 1.5 | 26.1 | 0.0 | <0.2 | A | A | AAA |
| 10 | Example | 6.4 | 68.0 | 47.4 | 12.5 | 8.1 | 31.8 | 2.0 | 29.8 | 0.2 | <0.2 | A | A | AAA |
| 11 | Example | 6.8 | 67.9 | 45.0 | 22.9 | 0.0 | 32.1 | 2.1 | 30.0 | 0.0 | <0.2 | A | A | AAA |
| 12 | Example | 6.9 | 68.1 | 46.1 | 22.0 | 0.0 | 31.9 | 0.9 | 31.0 | 0.0 | <0.2 | A | A | AAA |
| 13 | Example | 7.2 | 65.8 | 44.1 | 21.7 | 0.0 | 34.1 | 2.0 | 32.1 | 0.1 | <0.2 | A | A | AAA |
| 14 | Example | 7.1 | 69.1 | 48.1 | 21.0 | 0.0 | 30.8 | 0.0 | 30.8 | 0.1 | <0.2 | A | A | AAA |
| 15 | Comp. ex. | 21.0 | 0.0 | 0.0 | 0.0 | 0.0 | 0.0 | 0.0 | 0.0 | 0.0 | 2.8 | D | C | D |
| 16 | Comp. ex. | 23.1 | 0.0 | 0.0 | 0.0 | 0.0 | 0.0 | 0.0 | 0.0 | 0.0 | 3.0 | D | C | D |
| 17 | Comp. ex. | 22.1 | 0.0 | 0.0 | 0.0 | 0.0 | 0.0 | 0.0 | 0.0 | 0.0 | 4.1 | D | C | D |
| 18 | Comp. ex. | 20.1 | 0.0 | 0.0 | 0.0 | 0.0 | 0.0 | 0.0 | 0.0 | 0.0 | 2.1 | D | C | D |
| 19 | Comp. ex. | 6.1 | 22.8 | 0.0 | 0.0 | 22.8 | 65.4 | 0.0 | 65.4 | 11.8 | 1.1 | D | C | D |
| 20 | Comp. ex. | 6.0 | 18.8 | 0.0 | 0.0 | 18.8 | 68.8 | 0.0 | 68.8 | 12.4 | 1.4 | D | C | D |
| 21 | Example | 7.8 | 59.7 | 51.1 | 8.6 | 0.0 | 40.3 | 7.8 | 32.5 | 0.0 | <0.2 | A | A | AAA |
| 22 | Example | 7.7 | 60.1 | 50.8 | 9.3 | 0.0 | 39.9 | 7.7 | 32.2 | 0.0 | <0.2 | A | A | AAA |
| 23 | Example | 8.1 | 54.1 | 41.0 | 13.1 | 0.0 | 45.9 | 7.4 | 38.5 | 0.0 | <0.2 | A | A | AAA |
| 24 | Example | 9.9 | 49.5 | 49.5 | 0.0 | 0.0 | 50.3 | 7.9 | 42.4 | 0.2 | <0.2 | A | A | AA |
| 25 | Example | 10.8 | 34.7 | 34.7 | 0.0 | 0.0 | 65.3 | 7.5 | 57.8 | 0.0 | <0.2 | A | A | AA |
| 26 | Example | 11.1 | 33.8 | 33.8 | 0.0 | 0.0 | 66.1 | 7.5 | 58.6 | 0.1 | <0.2 | A | A | AA |
| 27 | Example | 12.5 | 29.1 | 29.1 | 0.0 | 0.0 | 70.9 | 8.5 | 62.4 | 0.0 | <0.2 | A | A | AA |
| 28 | Example | 13.8 | 23.3 | 23.3 | 0.0 | 0.0 | 76.6 | 8.1 | 68.5 | 0.1 | <0.2 | A | A | AA |
| 29 | Example | 14.8 | 20.4 | 20.4 | 0.0 | 0.0 | 79.6 | 9.1 | 70.5 | 0.0 | <0.2 | A | A | AA |
| 30 | Example | 17.5 | 15.5 | 15.5 | 0.0 | 0.0 | 84.4 | 9.0 | 75.4 | 0.1 | <0.2 | A | A | AA |
| 31 | Example | 20.0 | 10.0 | 10.0 | 0.0 | 0.0 | 90.0 | 10.0 | 80.0 | 0.0 | <0.2 | A | B | AA |
| 32 | Comp. ex. | 22.0 | 18.8 | 0.0 | 0.0 | 18.8 | 70.3 | 0.0 | 70.3 | 10.9 | 1.3 | D | C | D |
| 33 | Comp. ex. | Commercially available hot dip galvannealed steel sheet | | | | | | | | | | D | D | A |
| 34 | Comp. ex. | Commercially available hot dip Al coated steel sheet | | | | | | | | | | A | D | D |

Bold underlines indicate outside scope of present invention.

The chemical compositions and structures of the plating layers in the hot stamped bodies obtained in the examples and comparative examples and the various characteristics when hot stamping the plated steel materials were investigated by the following methods: The results are shown in Tables 1 and 2. In Tables 1 and 2, Comparative Examples 33 and 34 relate to the hot dip galvannealed (Zn-11% Fe) steel sheet and hot dip aluminum coated (Al-10% Si) steel sheet conventionally used as plated steel materials for hot stamping and show the results in the case of hot stamping these steel sheets. The chemical compositions and structures of the plating layers of Comparative Examples 33 and 34 clearly differ from the chemical compositions and surface structures of the plating layers according to the present invention, therefore analysis of the chemical compositions and structures of these plating layers were omitted. Further, Comparative Examples 33 and 34 are just commercially available products which were evaluated. Therefore, details of the production methods of these steel sheets are not known. Further, while not shown in Table 2, the Fe—Al containing phase (Fe—Al—Zn phase and FeAl phase) has island shapes. In the islands of the Fe—Al containing phase, the aspect ratio was 5.0 or less.

[Chemical Composition of Plating Layer]

The chemical composition of the plating layer was determined by dissolving the plating layer in an acid solution to which an inhibitor inhibiting corrosion of the steel base material was added and measuring the obtained solution by ICP emission spectrometry.

[Thicknesses of Fe—Al Layer and Oxide Layer]

The thicknesses of the Fe—Al layer and the oxide layer were determined by cutting out a test piece from the hot stamped body, burying it in a resin, etc., then polishing the cross-section, measuring the image observed by an SEM, and averaging the measured values of these in three different fields as the thicknesses of the Fe—Al layer and the oxide layer.

[Area Ratio and Composition of Each Phase in Main Layer]

The area ratio of each phase in the main layer was determined as follows: First, a prepared sample was cut into 25 mm×15 mm size. The plating layer surface was photographed by a 1500×power by an SEM. From the BSE image obtained and SEM-EDS mapping, the area ratio of each phase in the main layer was measured by computer image processing. The averages of these measured values at any five fields were determined as the area ratios of the MgZn phase, $Mg_2Zn_3$ phase, $MgZn_2$ phase, FeAl phase, Fe—Al—Zn phase, and other intermetallic compounds ($Mg_2$ Si and $Al_4$ Ca). Further, the area ratio of the Mg—Zn containing phase was determined as the area ratio of the total of the MgZn phase, $Mg_2 Zn_3$ phase, and $MgZn_2$ phase. Similarly, the area ratio of the Fe—Al containing phase was determined as the area ratio of the total of the FeAl phase and Fe—Al—Zn phase.

[LME Resistance]

The LME resistance was evaluated by subjecting a sample of the plated steel material before hot stamping to a hot V-bending test. Specifically, a sample 170 mm×30 mm of the plated steel material before hot stamping was heated in a heating furnace and taken out from the furnace when the temperature of the sample reached 900° C. A precision press was used to conduct a V-bending test. The V-bending die had a shape of a V-bending angle of 90° and R=1, 2, 3, 4, 5, and 10 mm. The LME resistance was ranked as follows: Rankings of AAA, AA, A, and B were deemed passing.

AAA: No LME cracking occurred even with R of 1 mm.

AA: LME cracking occurred with R of 1 mm, but LME cracking did not occur with R of 2 mm A: LME cracking occurred with R of 2 mm, but LME cracking did not occur with R of 3 mm B: LME cracking occurred with R of 3 mm, but LME cracking did not occur with R of 4 mm C: LME cracking occurred with R of 4 mm, but LME cracking did not occur with R of 5 mm D: LME cracking occurred with R of 5 mm, but LME cracking did not occur with R of 10 mm

[Corrosion Resistance]

The corrosion resistance of the hot stamped body was evaluated as follows. First, a sample 50 mm×100 mm of the hot stamped body was treated by zinc phosphate (SD5350 System: standard made by Nippon Paint Industrial Coatings Co., Ltd.), then was coated by electrodeposition (PN110 Powernix Gray: standard made by Nippon Paint Industrial Coatings Co., Ltd.) by a thickness of 20 μm and was baked at 150° C. for 20 minutes. Next, cross cuts (40×$\sqrt{2}$ mm, 2) were made reaching the base iron. The coated body was used for a combined cyclic corrosion test in accordance with JASO (M609-91). The maximum blister widths at eight locations around the cross cuts after the elapse of 150 cycles were measured. The average values of the obtained measured values were found and ranked as follows: Samples evaluated as A and B were deemed passing.

A: Width of coating blister from cross-cut of 1 mm or less

B: Width of coating blister from cross-cut of 1 to 2 mm

C: Width of coating blister from cross-cut of 2 to 4 mm

D: Red rusting

[Hydrogen Penetration Resistance]

The hydrogen penetration resistance of the hot stamped body was found as follows: First, a sample of the hot stamped body was stored in liquid nitrogen. Thermal desorption spectroscopy was used to find the concentration of hydrogen penetrating the hot stamped body. Specifically, the sample was heated in a heating furnace equipped with a gas chromatograph and the amount of hydrogen released from the sample up to 250° C. was measured. The measured amount of hydrogen was divided by the mass of the sample to find the amount of hydrogen penetration. This was ranked as follows: Rankings of AAA, AA, A, and B were deemed passing.

AAA: Amount of hydrogen penetration of 0.1 ppm or less

AA: Amount of hydrogen penetration of more than 0.1 to 0.2 ppm

A: Amount of hydrogen penetration of more than 0.2 to 0.3 ppm

B: Amount of hydrogen penetration of more than 0.3 to 0.5 ppm

C: Amount of hydrogen penetration of more than 0.5 to 0.7 ppm

D: Amount of hydrogen penetration of 0.7 ppm or more

Referring to Tables 1 and 2, in Comparative Example 1, the Si and Ca contents in the plating layer were small, therefore the acicular Al—Zn—Si—Ca phase was not formed in the surface structure of the plating layer before hot stamping. It is believed that a barrier layer comprised of a Ca-based oxide film was not formed at the time of heating in the hot stamping. As a result, at the time of the above heating, Zn and Mg in the plating layer evaporated, a thick Mg—Zn containing oxide layer of more than 1.0 μm was formed, an Mg—Zn containing phase was not formed in the main layer, and the LME resistance, hydrogen penetration resistance, and corrosion resistance were all evaluated as being poor. In Comparative Examples 2 and 5, similarly the Al, Si, and/or Ca content in the plating layer was small, therefore at the time of heating in the hot stamping, no barrier layer was formed and the LME resistance, hydrogen penetration resistance, and corrosion resistance were all evaluated as poor. In Comparative Example 4, the Mg content in the plating layer was large, the corrosion resistance fell due to the excessive sacrificial corrosion prevention action or, since the Mg content was large, hydrogen penetration occurred due to the evaporation of Mg at the time of hot stamping. In Comparative Examples 15 to 18, the cooling of the plating layer did not satisfy the predetermined two-stage cooling conditions, therefore an acicular Al—Zn—Si—Ca phase was not formed at the surface structure of the plating layer before the hot stamping, and, at the time of the heating in the hot stamping, Zn and Mg in the plating layer evaporated and, as a result, the LME resistance, hydrogen penetration resistance, and corrosion resistance were all evaluated as poor. From the results of Comparative Examples 15 to 18 and other examples, it is learned that to more reliably form the acicular Al—Zn—Si—Ca phase at 2.0% or more of area ratio and form a barrier layer comprised of a Ca-based oxide film at the time of the heating in the hot stamping, it is preferable to first cool by a 14° C./s or more or 15° C./s or more average cooling speed from the bath temperature to 450° C., then cool by a 5.5° C./s or less or 5° C./s or less average cooling speed from 450° C. to 350° C. In Comparative Example 19, the Si content in the plating layer was too high, therefore in the plating layer before the hot stamping, an $Mg_2$ Si phase (other intermetallic compound in Table 2) was preferentially formed, the acicular Al—Zn—Si—Ca phase was not sufficiently formed, and, as a result, the LME resistance, hydrogen penetration resistance, and corrosion resistance were all evaluated as poor. In Comparative Examples 20 and 32, the Ca content or the Al content in the plating layer was too high, therefore in the plating layer before hot stamping, $Al_4$ Ca and other intermetallic compounds (other intermetallic compounds in Table 2) were preferentially formed, an acicular Al—Zn—Si—Ca phase was not sufficiently formed, and, as a result, the LME resistance, hydrogen penetration resistance, and corrosion resistance were all evaluated as poor. In Comparative Example 33 using conventional hot dip galvannealed steel sheet, the hydrogen penetration resistance was excellent, but the LME resistance and corrosion resistance were evaluated as poor. In Comparative Example 34 using conventional hot dip aluminum coated steel sheet, the LME resistance was excellent, but the hydrogen penetration resistance and corrosion resistance were evaluated as poor.

In contrast to this, in all of the examples according to the present invention, by suitably controlling the chemical composition of the plating layer and the phases contained in the plating layer and the area ratios of the same, a hot stamped body in which the LME resistance and hydrogen penetration resistance were improved and, furthermore, the corrosion resistance was excellent could be obtained. From the BSE image of the SEM of the plating layer surface before hot stamping (and in accordance with need the SEM-EDS mapping image), in all examples, an acicular Al—Zn—Si—Ca phase was present in an area ratio of 2.0% or more at the surface structure of the plating layer before hot stamping.

Example B

In this example, the inventors studied the point of change of the cooling speed between fast cooling and slow cooling in two-stage cooling of a plating layer. First, except for using a plating bath for forming a plating layer similar to Example 10, etc. (bath temperature 600° C.), and further changing the point of change of the cooling speed to 375° C., 400° C., 425° C., 450° C., 475° C., and 500° C. and making the average cooling speed of the first stage 15° C./s and the average cooling speed of the second stage 5° C./s, they followed the same procedure as in the case of Example A to obtain plated steel materials with plating layers formed on both surfaces of the steel base materials. They examined the area ratios of the acicular Al—Zn—Si—Ca phases at the surface structures of the plating layers at the obtained plated steel materials. The results are shown in FIG. 4.

Figure 4:
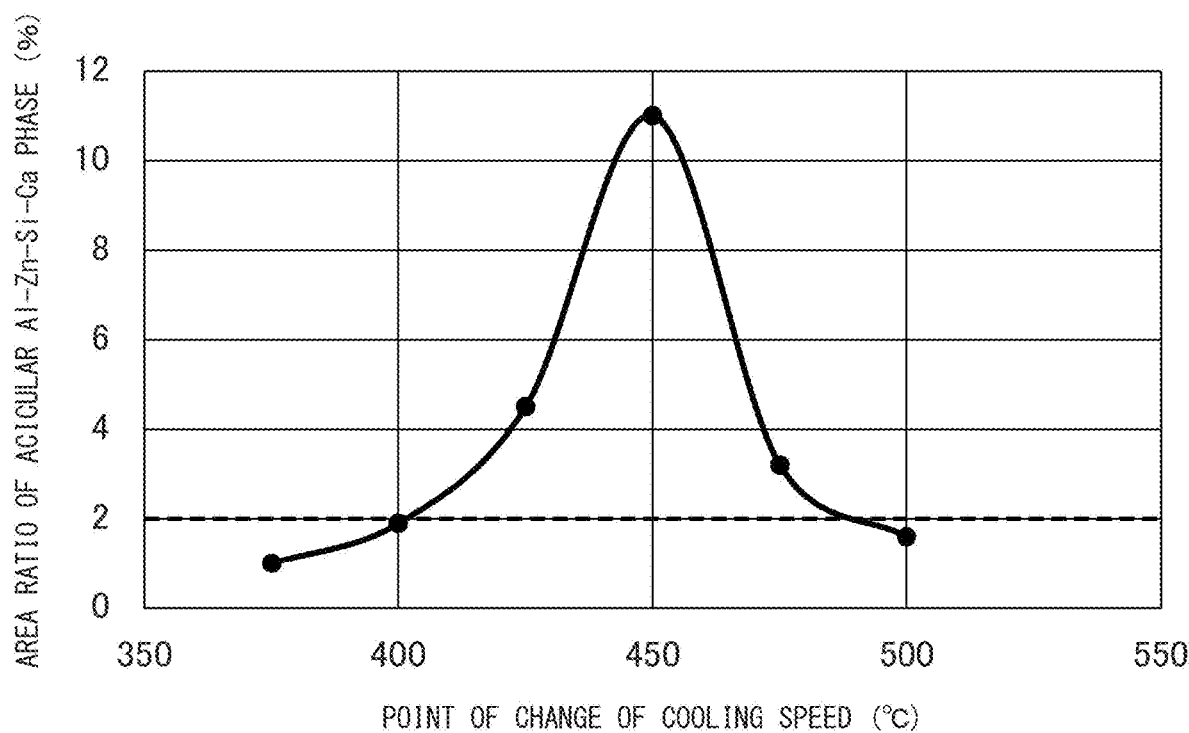
FIG. 4 is a graph showing a relationship between a point of change of a cooling speed when cooling a plating layer and formation of an acicular Al—Zn—Si—Ca phase.

Referring to FIG. 4, if the point of change of the cooling speed is 400° C., the area ratio of the acicular Al—Zn—Si—Ca phase is 1.9%, and therefore 2.0% or more could not be secured, while if the point of change of the cooling speed is 425° C., 450° C., and 475° C., 2.0% or more of the acicular Al—Zn—Si—Ca phase could be formed. In particular, if the point of change of the cooling speed is 450° C., the highest area ratio of the acicular Al—Zn—Si—Ca phase could be achieved.

REFERENCE SIGNS LIST 1 plating layer
2 oxide layer
3 diffusion layer
4 steel base material
5 interfacial layer
6 main layer
7 Fe—Al layer
8 Mg—Zn containing phase
9 Fe—Al containing phase
9a FeAl phase
11 α phase
12 α/τ eutectic phase
13 acicular Al—Zn—Si—Ca phase

The invention claimed is:

1. A hot stamped body comprising a steel base material and a plating layer on a surface of the steel base material, wherein the plating layer has a chemical composition comprising, by mass %,
Al: 15.00 to 45.00%,
Mg: 4.50 to 12.00%,
Si: 0.05 to 3.00%,
Ca: 0.05 to 3.00%,
Fe: 20.00 to 50.00%,
Sb: 0 to 0.50%,
Pb: 0 to 0.50%,
Cu: 0 to 1.00%,
Sn: 0 to 1.00%,
Ti: 0 to 1.00%,
Sr: 0 to 0.50%,
Cr: 0 to 1.00%,
Ni: 0 to 1.00%,
Mn: 0 to 1.00%, and
balance: Zn and impurities,
the plating layer comprises an interfacial layer positioned at an interface with the steel base material and containing Fe and Al and a main layer positioned on the interfacial layer,
the main layer comprises, by area ratio, 10.0 to 85.0% of an Mg—Zn containing phase and 15.0 to 90.0% of an Fe—Al containing phase,
the Mg—Zn containing phase comprises at least one selected from an MgZn phase, $Mg_2Zn_3$ phase, and $MgZn_2$ phase, and
the Fe—Al containing phase comprises at least one of an FeAl phase and Fe—Al—Zn phase and an area ratio of the Fe—Al—Zn phase in the main layer is 10.0% or less.

2. The hot stamped body according to claim 1, wherein the chemical composition of the plating layer comprises, by mass %,
Al: 20.00 to 30.00% and
Mg: 5.50 to 10.00%.

3. The hot stamped body according to claim 1, wherein the Mg—Zn containing phase comprises an MgZn phase, and an area ratio of the MgZn phase in the main layer is 30.0% or more.

4. The hot stamped body according to claim 1, wherein the Mg—Zn containing phase comprises an MgZn phase and $Mg_2Zn_3$ phase, and an area ratio of a total of the MgZn phase and $Mg_2Zn_3$ phase in the main layer is 25.0 to 85.0%.

5. The hot stamped body according to claim 1, wherein the Fe—Al containing phase comprises an FeAl phase and an area ratio of the FeAl phase in the main layer is 5.0 to 55.0%.

6. The hot stamped body according to claim 2, wherein the Mg—Zn containing phase comprises an MgZn phase, and an area ratio of the MgZn phase in the main layer is 30.0% or more.

7. The hot stamped body according to claim 2, wherein the Mg—Zn containing phase comprises an MgZn phase and $Mg_2Zn_3$ phase, and an area ratio of a total of the MgZn phase and $Mg_2Zn_3$ phase in the main layer is 25.0 to 85.0%.

8. The hot stamped body according to claim 3, wherein the Mg—Zn containing phase comprises an MgZn phase and $Mg_2Zn_3$ phase, and an area ratio of a total of the MgZn phase and $Mg_2Zn_3$ phase in the main layer is 25.0 to 85.0%.

9. The hot stamped body according to claim 2, wherein the Fe—Al containing phase comprises an FeAl phase and an area ratio of the FeAl phase in the main layer is 5.0 to 55.0%.

10. The hot stamped body according to claim 3, wherein the Fe—Al containing phase comprises an FeAl phase and an area ratio of the FeAl phase in the main layer is 5.0 to 55.0%.

11. The hot stamped body according to claim 4, wherein the Fe—Al containing phase comprises an FeAl phase and an area ratio of the FeAl phase in the main layer is 5.0 to 55.0%.

* * * * *